(No Model.)
J. SULLIVAN.
CASTER FOR STOVE LEGS.
No. 307,414. Patented Oct. 28, 1884.
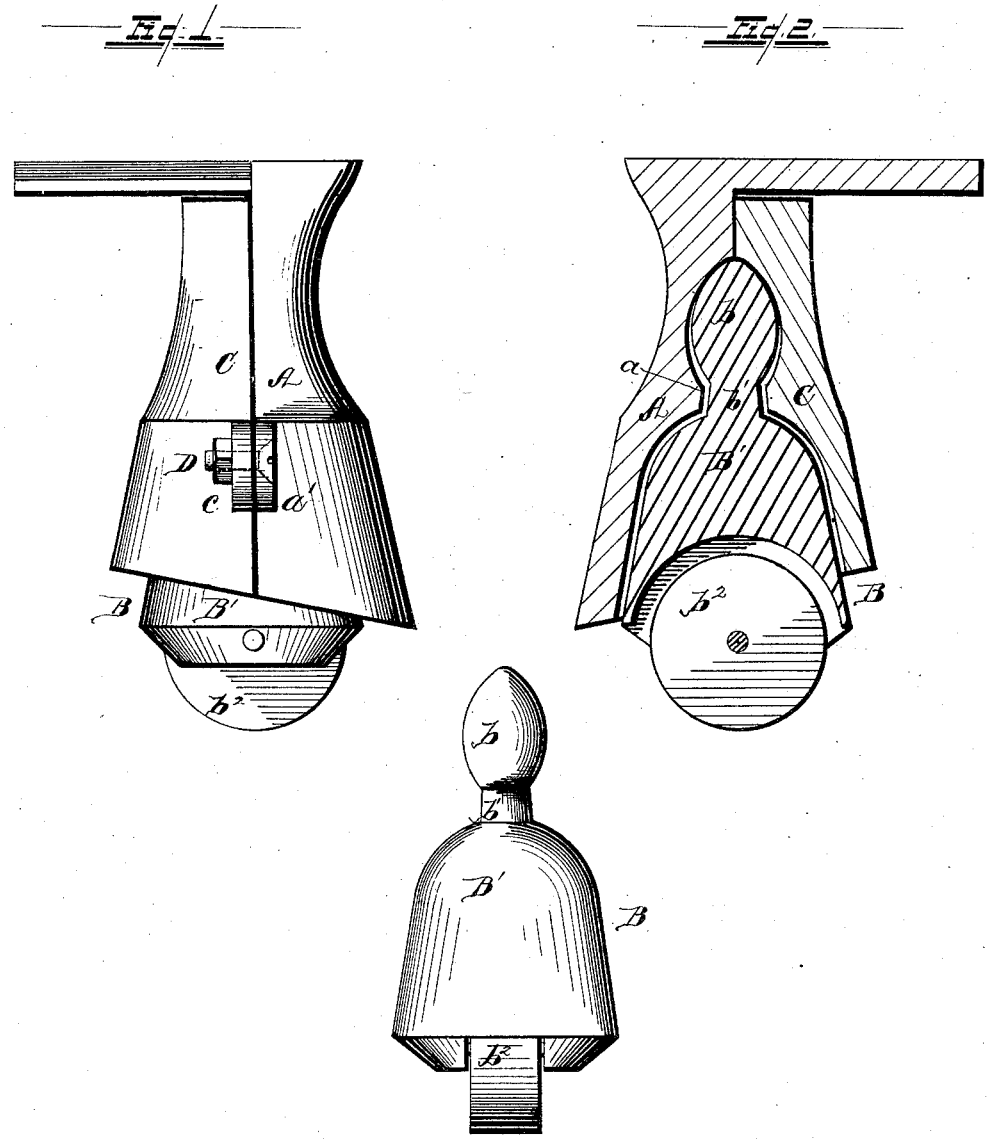
WITNESSES
Samuel E. Thomas
M. B. O'Dogherty
INVENTOR
Joseph Sullivan
By M. W. Leggett.
Attorney

UNITED STATES PATENT OFFICE.

JOSEPH SULLIVAN, OF DETROIT, MICHIGAN.

CASTER FOR STOVE-LEGS.

SPECIFICATION forming part of Letters Patent No. 307,414, dated October 28, 1884.

Application filed June 12, 1884. (No model.)

*To all whom it may concern:*

Be it known that I, JOSEPH SULLIVAN, of Detroit, county of Wayne, State of Michigan, have invented a new and useful Improvement in Stove-Leg Casters; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a side elevation of a device embodying my invention. Fig. 2 is a vertical section of the device. Fig. 3 is a separate view of the caster.

My invention relates to stove-leg casters, and has for its object novel means for readily confining the caster in place upon the stove-leg and permitting its ready disengagement therefrom.

As illustrated in the drawings, A represents the stove-leg proper, recessed to receive a caster, B, said caster provided with a head, $b$, and the leg with a rim, $a$, adapted to engage about the neck $b'$ of the caster.

C is a removable confining-plate.

The caster may be wholly located within the corresponding recess of the leg, or said confining-plate may be recessed in a corresponding manner, so as to partially fit over the caster. This confining-plate may be secured in place upon the leg by means of bolts D, inserted through the lugs $a'$ and $c$ upon the leg and the confining-plate. I do not, however, confine myself to any definite means of securing the confining-plate upon the leg, only that it may be removably secured thereto.

The operation of the device is evident. If it is desired to use the caster in connection with the leg, by removing the plate C, the caster may be inserted and then confined by securing said confining-plate in place. When it is desired to dispense with the caster, it may be easily removed from the leg by disengaging the confining-plate.

I do not limit myself to the employment of a caster so confined to a stove-leg merely, as this construction, it will be seen, may be also adapted to table-legs, bedsteads, &c., and I would have it understood that I contemplate its use in any connection to which it may be adapted as coming within the scope of my invention.

It will be seen that all these parts may be manufactured of easy castings, as they are simple in their construction.

The wheels $b^2$ of the caster are confined in the body B', forming the caster.

What I claim is—

1. The combination of the leg A, having a recess, the caster B, fitting in the recess, and the confining-plate C, detachably secured to the leg and confining the caster in position in the recess of the leg, substantially as described.

2. The combination, with a leg, of a caster, B, constructed with a head, $b$, and neck $b'$, located wholly or partially within the leg, recessed to correspond to the construction of said caster, and a confining-plate secured upon said leg, substantially as described.

In testimony whereof I sign this specification in presence of two witnesses.

JOSEPH SULLIVAN.

Witnesses:
 N. S. WRIGHT,
 M. B. O'DOGHERTY.